T. P. WILLIAMS.
FERTILIZER DISTRIBUTER.
APPLICATION FILED DEC. 23, 1913.
1,114,211.
Patented Oct. 20, 1914.
2 SHEETS—SHEET 1.
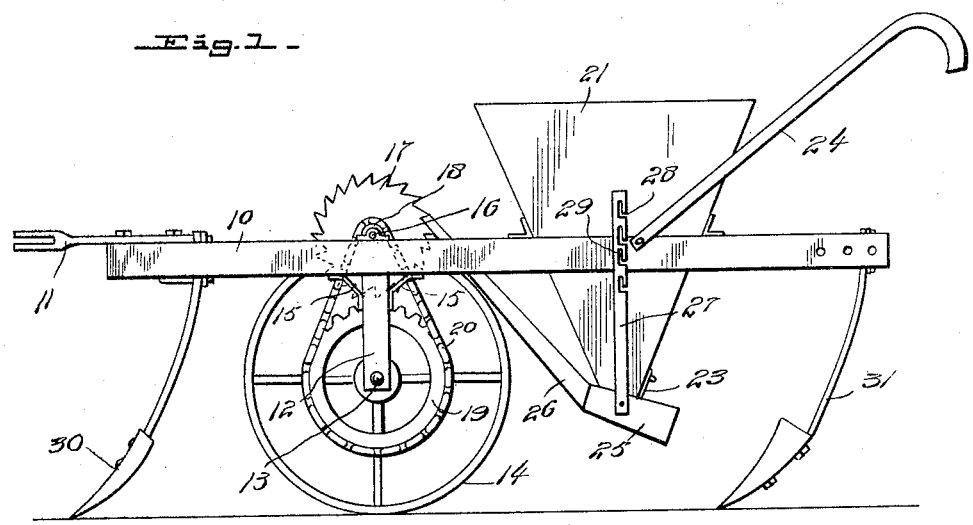
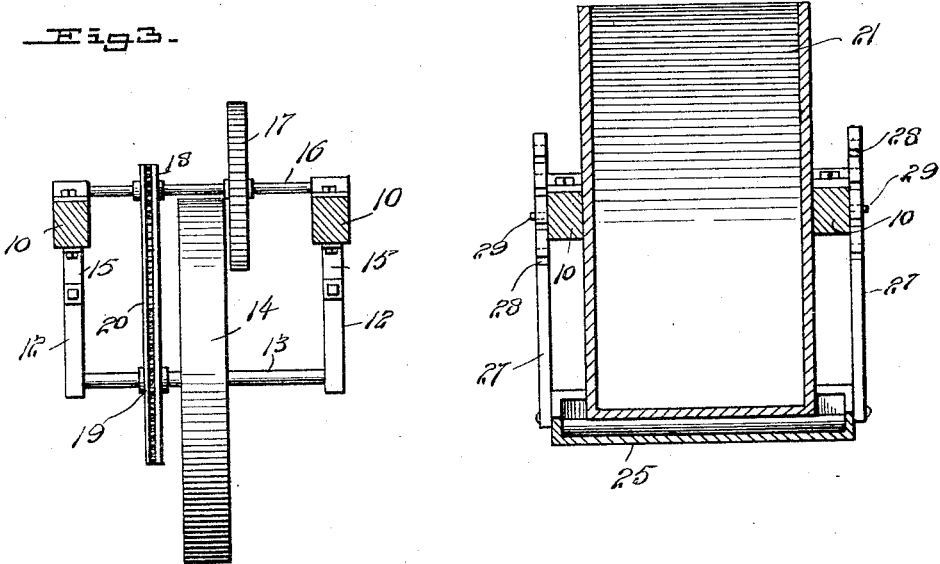
Inventor
T. P. Williams.
Witnesses
By
Attorneys T. P. WILLIAMS.
FERTILIZER DISTRIBUTER.
APPLICATION FILED DEC. 23, 1913.
1,114,211.
Patented Oct. 20, 1914.
2 SHEETS—SHEET 2.
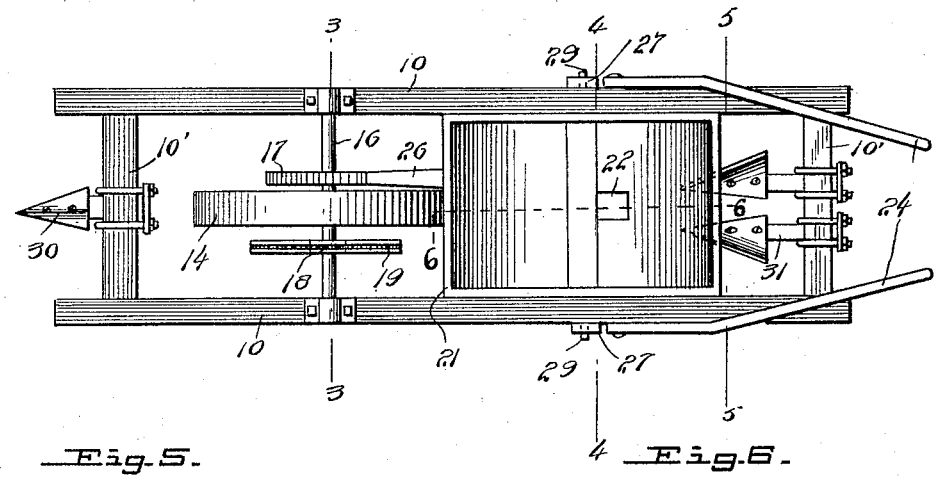
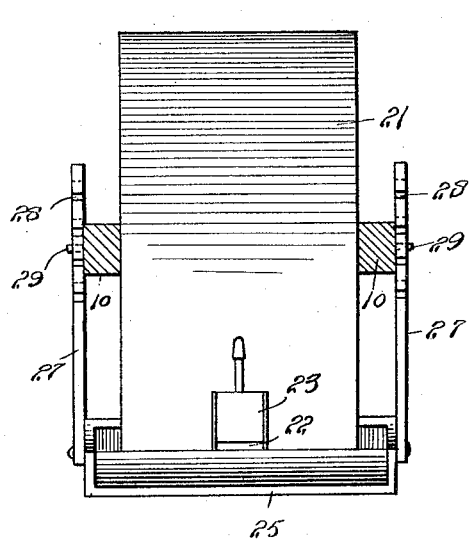
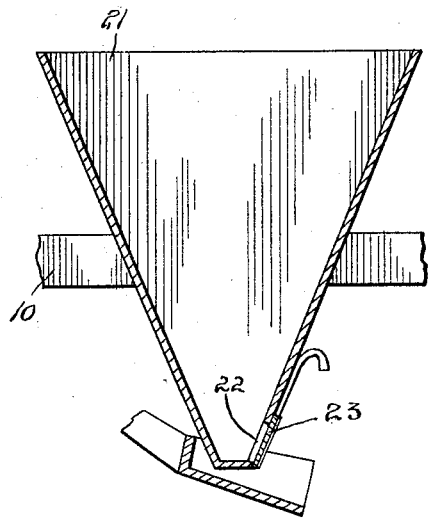
Witnesses
Chas. E. Kemper.
Harry M. Test
Inventor
T. P. Williams.
By Chandlee & Chandlee
Attorneys

UNITED STATES PATENT OFFICE.

THOMAS P. WILLIAMS, OF VINELAND, NORTH CAROLINA.

FERTILIZER-DISTRIBUTER.

1,114,211.

Specification of Letters Patent.  Patented Oct. 20, 1914.

Application filed December 23, 1913. Serial No. 808,452.

*To all whom it may concern:*

Be it known that I, THOMAS P. WILLIAMS, a citizen of the United States, residing at Vineland, in the county of Columbus, State of North Carolina, have invented certain new and useful Improvements in Fertilizer-Distributers; and I do hereby declare the following to be a full, clear, and exact description of the invention, such as will enable others skilled in the art to which it appertains to make and use the same.

This invention relates to improvements in fertilizer distributers.

One object of the invention is to provide a simply and novelly constructed device of this character whereby the fertilizer can be quickly and evenly distributed.

Another object is to provide a device of this character by means of which a furrow is made, fertilizer deposited in the furrow and the furrow covered up.

A further object is to provide a novel means for adjusting the discharge mechanism whereby the amount and speed of the fertilizer can be regulated.

Other objects and advantages will be apparent from the following description, when taken in connection with the accompanying drawing:

In the drawings: Figure 1 is a side elevation of my improved fertilizer distributer. Fig. 2 is a top plan view of the same. Fig. 3 is a vertical transverse sectional view on the line 3—3 of Fig. 2. Fig. 4 is a vertical transverse sectional view on the line 4—4 of Fig. 2. Fig. 5 is a vertical transverse sectional view on the line 5—5 of Fig. 2. Fig. 6 is a vertical longitudinal sectional view on the line 6—6 Fig. 2.

Referring particularly to the accompanying drawings, 10 represents elongated bars which form the frame of the machine and which are provided at their forward ends with a clevis 11 for attachment of draft animals. The ends of the bars are connected by the cross members 10'. Secured to each of the bars, at a suitable distance to the rear of the clevis are the depending bracket arms 12, the lower ends of which carry a transversely extending axle 13 on which is mounted a large wheel 14 adapted to run in the furrow. These arms 12 are suitably braced as at 15 to the under sides of the bars 10. Mounted transversely on the frame, at the upper ends of the arms 12 is a shaft 16 which carries a notched wheel 17, the purpose of which will appear hereinafter, and a small sprocket wheel 18. Also carried by the shaft 13 is a large sprocket wheel 19, and trained around this sprocket wheel and the sprocket wheel 18 is a drive chain 20.

Mounted between the rear portions of the bars 10 is a fertilizer receiving hopper 21, this hopper being downwardly tapering and projecting below the frame, where it is provided with discharge outlets 22 controlled by a slide 23. Suitable handles 24 are mounted on the frame and extend upwardly and rearwardly within reach of the operator to hold the machine in an upright position.

Disposed below the lower end of the hopper 21, and in such position as to receive fertilizer from the opening 22 is a distributing chute or spout 25. Connected to this spout and extending upwardly and forwardly is an arm 26, the forward end of which is disposed to be engaged by the teeth of the notched wheel 17 to knock the arm and rock the chute 25. Pivotally carried by the frame, on each side of the chute is a vertically extending bar 27, the upper end of each of which has formed in one edge a plurality of L-shaped notches 28, these notches being arranged for engagement with outwardly extending pins 29 carried by the side members 10 of the frame. By lifting the bars 27, the pins 29 will be disposed in the horizontal portions of the slots so that the bars can be swung away from the pins. By reversing this operation, the bars may be engaged with the pins by means of the same or any other of the slots. By providing pivotal movement between the bars 27 and the chute 25, the before-mentioned adjustment can be accomplished, and the chute permitted to rock as the notched wheel 17 rotates and knocks the arm 26 up and down.

Mounted on the forward end of the frame is a furrow opening shoe 30, and similarly mounted on the rear portion of the frame rearwardly of the hopper are two covering shoes 31. It will thus be seen that as the machine is drawn across a field the shoe 30 will open a furrow, the wheel 14 run in the furrow and drive the notched wheel 17 so that the chute 25 will be rocked and jar fertilizer which is delivered thereto from the hopper so that it falls into the furrow. The shoes 31 throw the soil from both sides of the furrow into the furrow and cover up the fertilizer. By the notched bars 27, and the pivotal connection between them and the chute, the chute can be raised and lowered so as to receive different quantities of fertilizer and thus regulate the amount and speed of the flow thereof.

What is claimed is:—

A fertilizer distributer comprising a frame, a furrow opener in the forward part of the frame, a wheel mounted in the frame and supporting the frame, a fertilizer hopper carried in the rear portion of the frame, a discharge chute disposed below the hopper and in position to receive fertilizer therefrom, an arm carried by the forward portion of the chute and extending upwardly and forwardly therefrom, means operated by the said wheel for intermittently knocking the said arms, pins carried by the rear portion of the frame and on opposite sides of the hopper, covering shoes carried by the frame in rear of the hopper, and notched bars pivotally connected to the chute and detachably and adjustably engaged with the pins.

In testimony whereof, I affix my signature, in the presence of two witnesses.

THOMAS P. WILLIAMS.

Witnesses:
J. R. WILLIAMS,
J. F. WILLIAMS.

---

Copies of this patent may be obtained for five cents each, by addressing the "Commissioner of Patents, Washington, D. C."